Patented May 16, 1939

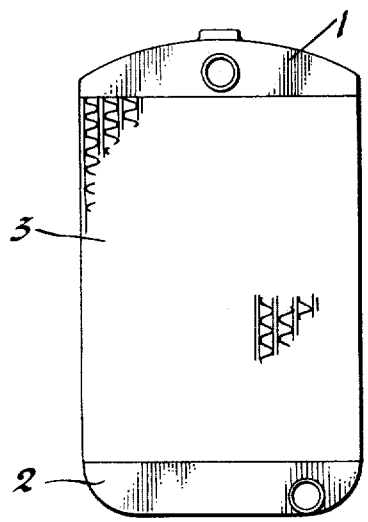
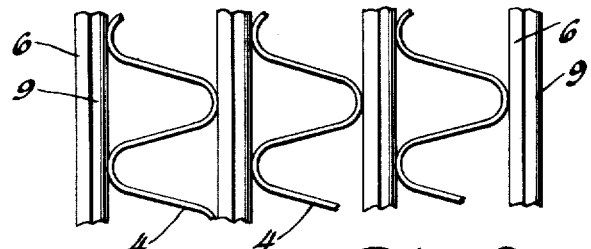
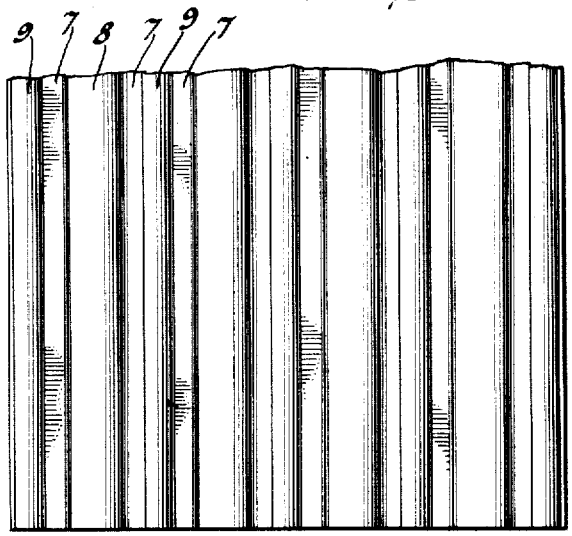
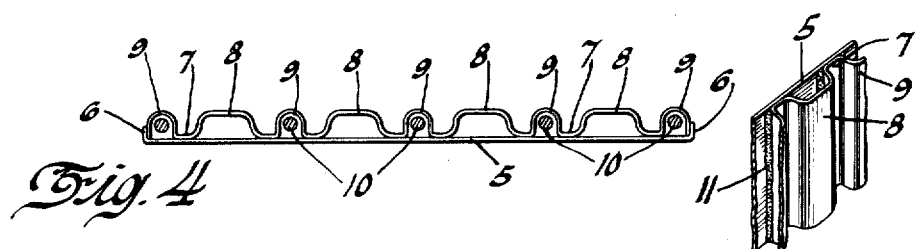
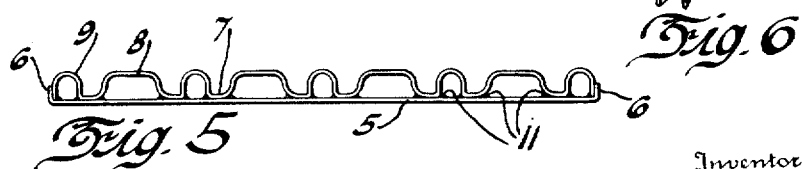
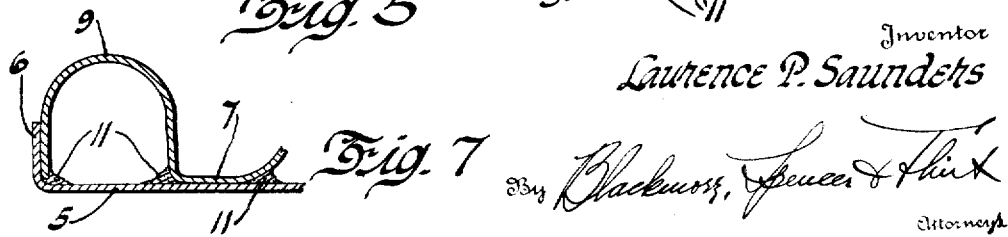

2,158,383

UNITED STATES PATENT OFFICE 2,158,383

METHOD OF MAKING HEAT EXCHANGERS

Laurence P. Saunders, Lockport, N. Y., assignor to General Motors Corporation, Detroit, Mich., a corporation of Delaware Application October 21, 1936, Serial No. 106,725

5 Claims. (Cl. 113—118)

This invention relates to an improvement in the manufacture of heat exchangers of the type wherein a number of spaced fluid flow tubes are made up each from a pair of preformed mating plates of relatively thin strip material secured face to face with formations therein affording interior passages.

As ordinarily constructed for use as condensers, heaters, coolers and the like, a given number of preformed strips are stacked in proper relation in a suitable fixture and the front and rear faces of the assembly are dipped in molten solder to join the parts and seal the front and rear edges of the complementary plates of each pair. When the plates are wide for a deep core, one or more sets of internal spacer knees are often formed to guard against inward collapse of the tube walls but the plates are not united internally at the knees because no commercially practical way has been devised heretofore to secure a satisfactory internal bond.

It is one of the aims of the present invention to provide a tube structure which readily lends itself to internal bonding. To this end the formations which afford transversely spaced internal passageways extending longitudinally of the strips are designed so that alternate passages are of a size and shape to house and locate adjacent the respective spacer ribs or knees, a small length or wire of fusible material which when the assembly is subjected to heat, melts and flows to and between the surfaces to be bonded. The multiplicity of bonds between the wall plates of each tube give an exceptionally rugged assembly.

It may be here stated that non-oxidizing brazing of the parts by means of an inert gas is contemplated and accordingly it is proposed that the tube walls be of strip steel and the bonding material of copper and that the melting of the copper be effected by placing the assembly in a hydrogen brazing furnace.

For a better understanding of the invention reference may be had to the accompanying drawing wherein Figure 1 is an elevation of a heat exchanger assembly; Figure 2 is an enlarged view showing a portion of the radiating core; Figure 3 is a plan view of one of the wall strips; Figure 4 is a transverse section through one of the tubes prior to brazing; Figure 5 is a view similar to Figure 4 but shows the parts subsequent to the brazing operation; Figure 6 shows in perspective a fragment of the wall tube and Figure 7 is a greatly enlarged sectional view along one edge of the brazed tube.

In the drawing an assembled cooling unit is illustrated in Figure 1 wherein inlet and outlet headers 1 and 2, respectively, are connected for fluid flow through a heat radiating core 3 which comprises a number of spaced tubes. Heat radiating fins or separators 4, as seen in Figure 2, may be placed between the tubes to assist in the transfer of heat between the fluid flowing through the tubes and the fluid flowing around the tubes.

Each tube is made by nesting a pair of preformed plates together in face to face relation. For the sake of simplicity and economy of manufacture one of the plates, as at 5, is flat throughout all of its area except for the lateral flanges 6—6 turned up along each side. The other plate carries the necessary formations to afford interior passageways and this consists in effect of a transversely corrugated sheet to provide a series of transversely spaced and longitudinally extending passageways separated one from another by a series of longitudinal spacer ribs or knees 7. Alternately the passages are wide and narrow as indicated at 8 and 9, respectively, with the opposite side edges of the plate shaped to fit telescopically within the flanges 6 of the cooperating plate 5. The relatively narrow passages 9 are of a size to locate properly a sufficient amount of fusible material, which for convenience may be in the form of a wire 10, to seal and bond the adjacent contacting surfaces of the two plates, i. e., the surfaces engaged with the flanges 6 and by the knees 7.

In manufacture, the plates are first formed and fitted together as shown in Figure 4, the wires 10 being fitted or inserted into the pockets 9 either before or after the plates are brought together. When the interfitted plates are then placed in a suitable heating oven preferably in a horizontal plane with the flat plate 5 below the corrugated plate, the fusible material 10 softens or melts to flow by gravity and capillarity between the contacting surfaces of the plates for effectively sealing and joining the same. Ordinarily in addition to the capillary flow between the surfaces a small fillet 11 builds up in each of the several corners of the plate seating surfaces, which further strengthens the joint. After the flow of the fusible material, the spaces within the narrow depressions 9 serve as fluid passageways as do also the larger passages 8.

The provision of the narrow passage is of particular importance in that it locates the fusible metal closely adjacent the surfaces to be bonded and prevents displacement of the wires 10 during handling. There is, therefore, insured a firm bond throughout the length of each of the transverse succession of spacer ribs and the several large area bends distributed across the plates insure an unusually sturdy construction to withstand rough usage and the severe strains of high pressure installations.

I claim:

1. In the manufacture of heat exchangers of the type having fluid flow tubes extending between and connecting spaced headers, the method of making a heat exchange tube, comprising forming a plate with alternately wide and narrow transversely spaced corrugations each extending continuously throughout the length of the plate from end to end thereof to open into the headers, fitting to the inner face of the corrugated plate and in surface contact with the apices of said corrugations a second and substantially flat plate, with inserts of bonding material contained whereby within the spaces afforded by the relatively narrow corrugations, and heating the assembly to flow the bonding material out of said spaces to the points of contact between the plates.

2. In the manufacture of heat exchangers of the type having fluid flow tubes extending between and connecting spaced headers, the method of making a heat exchanger fluid flow tube, comprising forming a plate with longitudinally continuous corrugations extending from end to end of the plate to extend to and open into the headers, fitting a second plate thereto in contact with the apices of the corrugations in the adjacent face thereof, inserting lengths of fusible material in alternate corrugations and subjecting the parts to a temperature to flow the fusible material out of said corrugations to the contacting surfaces of the plates for joining the same.

3. In the manufacture of heat exchangers of the type having a pair of spaced headers connected by fluid flow passages, the method of making a fluid flow passage, comprising forming a pair of mating plates with longitudinal troughs in at least one of the plates of a length to extend to and open into the headers, utilizing every other of the troughs as temporary locating pockets for lengths of bonding material by fitting to the pockets lengths of bonding material of a cross sectional area only slightly less than the size of the pockets, and applying heat with the plates face to face, to flow the bonding material to the abutting surfaces of the plates said flow clearing the troughs for service as fluid flow passages.

4. In the manufacture of heat exchangers of the type having a series of heat exchange tubes connecting a pair of spaced headers, the method of making a fluid flow tube which consists in placing a plate having longitudinally extending corrugations arranged to extend to and open into the headers on top of a flat plate with the apices only of the corrugations in surface contact with the flat plate, inserting fusible material in every other of the spaces between the plates provided by the corrugations, and placing the superposed plates with the flat plate beneath the corrugated plate in an oven for the action of a melting temperature on said fusible material to flow the same to and bond together the contacting surfaces of the plates and concurrently clear said spaces for use as fluid flow passages.

5. In the manufacture of heat exchangers wherein a pair of plates are arranged face to face to afford a heat exchange tube connected at opposite ends with a pair of spaced headers, the method which includes preforming the plates with a series of transversely spaced and longitudinally extending spacer knees in at least one of the plates, the spaces between the knees affording internal fluid flow passages to extend to and open into the headers and said spaces being alternately wide and narrow, the narrow spaces being of a size to contain fusible material sufficient for bonding the contacting portions of the plates, inserting wires o˙ fusible material in said narrow spaces between a pair of plates and then applying heat to flow said fusible material between the contacting portions of the plates and clear of said spaces.

LAURENCE P. SAUNDERS.

CERTIFICATE OF CORRECTION.

Patent No. 2,158,383.            May 16, 1939.

LAURENCE P. SAUNDERS.

It is hereby certified that error appears in the printed specification of the above numbered patent requiring correction as follows: Page 2, first column, line 21, claim 1, for the word "whereby" read wholly; and that the said Letters Patent should be read with this correction therein that the same may conform to the record of the case in the Patent Office.

Signed and sealed this 4th day of July, A. D. 1939.

Henry Van Arsdale (Seal)                          Acting Commissioner of Patents.

handling. There is, therefore, insured a firm bond throughout the length of each of the transverse succession of spacer ribs and the several large area bends distributed across the plates insure an unusually sturdy construction to withstand rough usage and the severe strains of high pressure installations.

I claim:

1. In the manufacture of heat exchangers of the type having fluid flow tubes extending between and connecting spaced headers, the method of making a heat exchange tube, comprising forming a plate with alternately wide and narrow transversely spaced corrugations each extending continuously throughout the length of the plate from end to end thereof to open into the headers, fitting to the inner face of the corrugated plate and in surface contact with the apices of said corrugations a second and substantially flat plate, with inserts of bonding material contained whereby within the spaces afforded by the relatively narrow corrugations, and heating the assembly to flow the bonding material out of said spaces to the points of contact between the plates.

2. In the manufacture of heat exchangers of the type having fluid flow tubes extending between and connecting spaced headers, the method of making a heat exchanger fluid flow tube, comprising forming a plate with longitudinally continuous corrugations extending from end to end of the plate to extend to and open into the headers, fitting a second plate thereto in contact with the apices of the corrugations in the adjacent face thereof, inserting lengths of fusible material in alternate corrugations and subjecting the parts to a temperature to flow the fusible material out of said corrugations to the contacting surfaces of the plates for joining the same.

3. In the manufacture of heat exchangers of the type having a pair of spaced headers connected by fluid flow passages, the method of making a fluid flow passage, comprising forming a pair of mating plates with longitudinal troughs in at least one of the plates of a length to extend to and open into the headers, utilizing every other of the troughs as temporary locating pockets for lengths of bonding material by fitting to the pockets lengths of bonding material of a cross sectional area only slightly less than the size of the pockets, and applying heat with the plates face to face, to flow the bonding material to the abutting surfaces of the plates said flow clearing the troughs for service as fluid flow passages.

4. In the manufacture of heat exchangers of the type having a series of heat exchange tubes connecting a pair of spaced headers, the method of making a fluid flow tube which consists in placing a plate having longitudinally extending corrugations arranged to extend to and open into the headers on top of a flat plate with the apices only of the corrugations in surface contact with the flat plate, inserting fusible material in every other of the spaces between the plates provided by the corrugations, and placing the superposed plates with the flat plate beneath the corrugated plate in an oven for the action of a melting temperature on said fusible material to flow the same to and bond together the contacting surfaces of the plates and concurrently clear said spaces for use as fluid flow passages.

5. In the manufacture of heat exchangers wherein a pair of plates are arranged face to face to afford a heat exchange tube connected at opposite ends with a pair of spaced headers, the method which includes preforming the plates with a series of transversely spaced and longitudinally extending spacer knees in at least one of the plates, the spaces between the knees affording internal fluid flow passages to extend to and open into the headers and said spaces being alternately wide and narrow, the narrow spaces being of a size to contain fusible material sufficient for bonding the contacting portions of the plates, inserting wires o˙ fusible material in said narrow spaces between a pair of plates and then applying heat to flow said fusible material between the contacting portions of the plates and clear of said spaces.

LAURENCE P. SAUNDERS.

CERTIFICATE OF CORRECTION.

Patent No. 2,158,383.             May 16, 1939.

LAURENCE P. SAUNDERS.

It is hereby certified that error appears in the printed specification of the above numbered patent requiring correction as follows: Page 2, first column, line 21, claim 1, for the word "whereby" read wholly; and that the said Letters Patent should be read with this correction therein that the same may conform to the record of the case in the Patent Office.

Signed and sealed this 4th day of July, A. D. 1939.

Henry Van Arsdale (Seal)                           Acting Commissioner of Patents.